(12) United States Patent
Steinmeyer et al.

(10) Patent No.: US 10,391,823 B2
(45) Date of Patent: Aug. 27, 2019

(54) METHOD AND SYSTEM FOR DETERMINING A PRESSURE DEVIATION BETWEEN A SETPOINT TIRE PRESSURE AND AN ACTUAL TIRE PRESSURE FOR A TIRE OF A VEHICLE AS WELL AS FOR DETERMINING A WHEEL LOAD

(71) Applicant: VOLKSWAGEN AG, Wolfsburg (DE)

(72) Inventors: Simon Steinmeyer, Braunschweig (DE); Marc-Michael Meinecke, Sassenburg (DE); Pär Degerman, Oxelösund (SE); Carsten Deeg, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 127 days.

(21) Appl. No.: 14/909,349

(22) PCT Filed: Jul. 18, 2014

(86) PCT No.: PCT/EP2014/065477
§ 371 (c)(1),
(2) Date: Feb. 1, 2016

(87) PCT Pub. No.: WO2015/014636
PCT Pub. Date: Feb. 5, 2015

(65) Prior Publication Data
US 2016/0200155 A1    Jul. 14, 2016

(30) Foreign Application Priority Data

Aug. 1, 2013   (DE) .................. 10 2013 108 285

(51) Int. Cl.
*B60C 23/06*   (2006.01)
*B60C 23/04*   (2006.01)

(52) U.S. Cl.
CPC .......... *B60C 23/06* (2013.01); *B60C 23/0486* (2013.01); *B60C 23/061* (2013.01)

(58) Field of Classification Search
CPC ........................................ B60C 23/06–23/067
See application file for complete search history.

(56) References Cited

U.S. PATENT DOCUMENTS 6,946,954 B2    9/2005   Piëch et al.
7,000,462 B2    2/2006   Hillenmayer et al.
(Continued)

FOREIGN PATENT DOCUMENTS

DE    100 60 392    6/2002
DE    102 05 815    8/2003
(Continued)

OTHER PUBLICATIONS

International Search Report, dated Sep. 4, 2014, issued in corresponding International Application No. PCT/EP2014/065477.
(Continued)

*Primary Examiner* — Charles D Garber
*Assistant Examiner* — Alia Sabur
(74) *Attorney, Agent, or Firm* — Hunton Andrews Kurth LLP (57) ABSTRACT

A pressure deviation between a setpoint tire pressure and an actual tire pressure for a tire of a vehicle is determined by the following steps:
Ascertaining a wheel load for the tire.
Ascertaining a dynamic tire radius of the tire.
Determining the pressure deviation as a function of the wheel load and the dynamic tire radius.

9 Claims, 3 Drawing Sheets

(56) References Cited

U.S. PATENT DOCUMENTS

| | | | |
|---|---|---|---|
| 7,912,604 B2 | 3/2011 | Oshiro | |
| 9,358,846 B2 | 6/2016 | Singh et al. | |
| 2003/0121319 A1* | 7/2003 | Kojima | B60C 23/061 73/146.2 |
| 2004/0225423 A1 | 11/2004 | Carlson et al. | |
| 2006/0276984 A1* | 12/2006 | Kobe | B60C 23/061 702/75 |
| 2007/0034000 A1 | 2/2007 | Nakao | |
| 2010/0180677 A1 | 7/2010 | Katou | |
| 2011/0190974 A1* | 8/2011 | Wada | B60C 23/061 701/31.4 |
| 2014/0114558 A1* | 4/2014 | Singh | B60C 23/0488 701/124 |
| 2015/0061852 A1* | 3/2015 | Fu | B60C 23/0474 340/442 |

FOREIGN PATENT DOCUMENTS

| | | |
|---|---|---|
| DE | 103 52 539 | 6/2005 |
| DE | 102006020490 A1 | 8/2007 |
| DE | 10 2009 057 578 | 6/2011 |
| DE | 10 2009 057 579 | 6/2011 |
| EP | 1 880 874 | 1/2008 |
| EP | 2 722 202 | 4/2014 |
| JP | 2004-317443 A | 11/2004 |
| JP | 2010-076702 | 4/2010 |
| WO | 03/016115 | 2/2003 |
| WO | 2005/097525 | 10/2005 |
| WO | 2005/097525 A1 | 10/2005 |

OTHER PUBLICATIONS

International Search Report, dated Sep. 9, 2014, issued in corresponding International Application No. PCT/EP2014/065476.

G. Rill, "Fahrzeugdynamik", pp. 1-18, 2001 (excerpt from lecture notes).

H. Shraim et al., "Estimation and Analysis of the Tire Pressure Effects on the Comportment of the Vehicle Center of Gravity", Proceedings of the 2006 International Workshop on Variable Structure Systems, IEEE Conference Paper, Jul. 2006, pp. 268-273.

* cited by examiner

METHOD AND SYSTEM FOR DETERMINING A PRESSURE DEVIATION BETWEEN A SETPOINT TIRE PRESSURE AND AN ACTUAL TIRE PRESSURE FOR A TIRE OF A VEHICLE AS WELL AS FOR DETERMINING A WHEEL LOAD

FIELD OF THE INVENTION

The present invention relates to a method and a system for determining a pressure deviation between a setpoint tire pressure or an optimum tire pressure and an actual tire pressure for a tire of a vehicle. The present invention furthermore relates to a method and a system for determining a wheel load even while traveling.

BACKGROUND INFORMATION

German Published Patent Application No. 10 2009 057 578 discloses checking a wheel load distribution of a plurality of tires of a vehicle on the basis of the length of a tire contact area and a tire pressure of each tire.

German Published Patent Application No. 10 2009 057 579 describes ascertaining a setpoint tire pressure based on an actual value and a setpoint value of a tire contact area.

German Published Patent Application No. 103 52 539 discloses monitoring a pneumatic-tired vehicle with the aid of a deformation sensor.

The rolling resistance of a vehicle substantially determines the energy required by the vehicle to overcome a travel distance. In the case of passenger cars, approximately 20% of the energy must be used to overcome the rolling resistance on highways. In urban areas, this percentage rises to 40%. In the case of trucks, this percentage is even higher. On highways, in the case of trucks, 66% of the energy consumption is attributable to overcoming the rolling resistance. A reduction of the rolling resistance by 3% would therefore reduce the entire energy consumption of trucks on highways by 2%. A further criterion for the optimum tire pressure is a vehicle stability and thus the safety of the driver and the safety of all other road users.

SUMMARY

Example embodiments of the present invention provide an indication for a driver of a vehicle by which an optimum tire pressure may be set.

According to an example embodiment of the present invention, a method for determining a pressure deviation between a setpoint tire pressure or optimum tire pressure and an actual tire pressure for a tire of a vehicle includes the following steps:
  Automatically ascertaining a wheel load, which acts on the tire mainly as a result of the load of vehicle.
  Automatically ascertaining a dynamic tire radius of the tire. A dynamic tire radius refers to the radius the tire assumes when the vehicle is driving straight ahead. For example, the dynamic tire radius may be determined via the rolling circumference of the tire. The rolling circumference corresponds to the distance that the tire covers without slip during one rotation. The rolling circumference may be calculated, for example, from the quotient of the distance traveled by the vehicle divided by the number of rotations of the tire.
  Automatically determining the pressure deviation as a function of the wheel load and the dynamic tire radius.

In the following, numerous variants or example embodiments are described of how the setpoint tire pressure and the actual tire pressure and thus the pressure deviation may be determined as a function of the wheel load and of the dynamic tire radius.

According to a first variant, there exists a setpoint tire pressure function, via which the setpoint tire pressure may be determined as a function of the wheel load. For this purpose, the corresponding setpoint tire pressure function for all tire variants may be stored in a database for example, to which the vehicle has access, such that the vehicle, with the knowledge of the setpoint tire pressure function associated with its tire type, is able to determine the associated ideal tire pressure or setpoint tire pressure as a function of the measured wheel load.

A non-loaded tire radius of the tire may be specified, i.e. the non-loaded tire radius is known to the vehicle. For example, the non-loaded tire radius may be determined when the tire is lying on the ground, so that its tire contact patch does not make contact with the ground. The actual tire pressure may be calculated as a function of the wheel load, of the non-loaded tire radius and of the dynamic tire radius with the aid of the tire rigidity function.

The tire rigidity function corresponds to a mathematical description of the tire characteristics of the respective tire. Using the tire rigidity function, it is possible to determine the tire rigidity as a function of the wheel load, the actual tire pressure and, if applicable, of the current velocity of the vehicle.

The following equation (1) indicates an example of the tire rigidity function.

$$m = \frac{a}{f} \times \left(\frac{f}{p+k}\right)^n - b \times v. \tag{1}$$

Here, m corresponds to the tire rigidity, f to the wheel load, and v to the velocity of the vehicle. a, b, k, and n are constants. Since constant b is normally very small, it is also possible to determine tire rigidity m without the term "b*v".

It is also possible, however, to determine tire rigidity m via the relationship according to the following equation (2).

$$m = d/f \tag{2}$$

Here, f corresponds to the wheel load, and d corresponds to the difference between the non-loaded tire radius $r_0$ and the dynamic tire radius $r_{dyn}$ according to the following equation (3).

$$d = r_0 - r_{dyn} \tag{3}$$

In other words, if the wheel load, the dynamic tire radius and the non-loaded tire radius are known, it is possible to calculate the tire rigidity by the preceding equations (2) and (3). Via the tire rigidity function, it is possible to calculate the actual tire pressure on the basis of the calculated tire rigidity and the wheel load (as well as the velocity, if applicable) by rearranging the tire rigidity function to calculate the actual tire rigidity or by determining, by the tire rigidity function, a value for the actual tire pressure, for which the tire rigidity calculated by the tire rigidity function corresponds to the tire rigidity calculated otherwise.

Regarding the tire rigidity function, there are two options.
  The tire rigidity function is specified completely (i.e. with exact values for all constants) such that the respective tire rigidity of the tire may be calculated already on the basis of the first measured values for the wheel load and the actual tire pressure as well as, if applicable, the current velocity of the vehicle.

The tire rigidity function is specified without knowledge of its constants (this would be a, b, k and n in the example of equation (1)). In this case, the constants are learned or determined on the basis of measured values, which are ascertained for multiple points in time for the wheel load, the actual tire pressure, and the velocity of the vehicle, such that e.g. the square norm of an estimation error is minimized. For this purpose, for example, a Kalman filter (or another suitable filter) monitors the correlation between the measured values over a longer period of time. The constants or parameters for the specified tire rigidity function are determined in this manner, which is also referred to as parameter identification. For this purpose, it is also possible to consider the wheel load or the actual tire pressure quasi as constants or parameters, so that, via the measured values measured over the longer period of time, it is possible to determine not only the constants (e.g. a, b, k and n), but also the wheel load or the actual tire pressure. In other words, the method first learns the constants of the tire rigidity function, before the tire rigidity function may be used in particular for calculating the tire rigidity. In case of a Kalman filter, the constants or parameters of the tire rigidity function to be determined form the so-called Kalman system state vector. This vector is estimated recursively over time by incorporating the measured value.

The tire rigidity may be determined with the aid of the tire rigidity function. Subsequently, the non-loaded tire radius $r_0$ is ascertained by the following equation (4) as a function of the dynamic tire radius $r_{dyn}$, the wheel load f and the determined tired rigidity m.

$$r_0 = r_{dyn} + m*f \quad (4)$$

The calculation of the non-loaded tire radius advantageously offers an alternative to the specification of the non-loaded tire radius.

It is also possible for the setpoint tire pressure not to be specified, but to be rather determined. This is possible for example as a function of an optimization criterion or as a function of a design criterion, with the aid of which the setpoint tire pressure is determined. This criterion may differ depending on the case of application. One possibility is to specify a fixed ratio $c_{ideal}$ for the ratio between an ideal dynamic tire radius $r_{ideal}$ and the non-loaded tire radius $r_0$, as is the case according to the following equation (5).

$$C_{ideal} = r_{ideal}/r_0 \quad (5)$$

Upon the determination of the ideal dynamic tire radius, particularly on the basis of the above-described equation (5), it is possible to determine the setpoint tire pressure as a function of the ideal dynamic tire radius with the aid of the tire rigidity function.

It is possible to calculate an ideal difference $d_{ideal}$ from the difference between the ideal dynamic tire radius $r_{ideal}$ and the non-loaded tire radius $r_0$, as shown in equation (6).

$$d_{ideal} = r_0 - r_{ideal} \quad (6)$$

It is thus possible to determine a setpoint tire rigidity via the previously described equation (2).

Finally, by rearranging the tire rigidity function accordingly, it is possible to determine the appropriate setpoint tire pressure with the aid of the tire rigidity function and with knowledge of the wheel load (and, if applicable, the velocity) on the basis of the known setpoint tire rigidity. Or, using the tire rigidity function, a value is determined for the setpoint tire pressure, for which the tire rigidity calculated by the tire rigidity function corresponds to the setpoint tire rigidity.

A method for determining a wheel load for a tire of a vehicle is also provided, which includes the following steps:
Ascertaining the actual tire pressure, which may be achieved for example by a tire pressure sensor integrated in the tire.
Ascertaining a dynamic tire radius of the tire.
Specifying a non-loaded tire radius of the tire in the non-loaded state.
Determining a wheel load for the tire as a function of the actual tire pressure, the dynamic tire radius and the non-loaded tire radius with the aid of the tire rigidity function.

On the basis of the dynamic tire radius $r_{dyn}$ and the non-loaded tire radius $r_0$, it is possible to demonstrate the relationship between the tire rigidity m and the wheel load f described in equation (7).

$$m = \frac{r_0 - r_{dyn}}{f} \quad (7)$$

A second relationship between the tire rigidity and the wheel load exists via the tire rigidity function. Thus there are two equations for the two unknowns m and f such that it is possible to calculate both the tire rigidity as well as the wheel load.

For example, it is possible to determine the dynamic tire radius by determining the distance the vehicle has traveled on the basis of GPS data, and by then dividing this traveled distance by the number of rotations of the respective tire, which are detected while the respective tire covered this distance. The number of rotations of the respective tire, for instance, may be determined on the basis of so-called "wheel ticks", where for example 100 wheel ticks per tire rotation are detected. One wheel tick corresponds to a measuring signal, which is detected by a sensor when the tire is rotated about a predefined angle of rotation.

As already described previously in the definition of the dynamic tire radius, it is possible to determine the dynamic tire radius accurately only if the tire does not exhibit slip. For this reason, when determining the dynamic tire radius, dynamic driving situations of the vehicle (for example hard braking of the vehicle, an acceleration with spinning tires) should therefore be excluded. Such dynamic driving situations may be detected for example by acceleration sensors or by analyzing brake signals, ABS signals or ESP signals, so that the dynamic tire radius is determined only in driving situations in which the tire does not exhibit slip. Furthermore, a Kalman filter or another suitable filter method may be used to compare the wheel ticks detected over a predefined interval with expected wheel ticks in order to detect outliers and not to take these into account when determining the dynamic tire radius.

Furthermore, the dynamic tire radius of the tire of the vehicle may be ascertained as a function of a yaw rate $\dot{\Psi}$ of the vehicle, a rate of rotation DG of the tire, a further rate of rotation $DG_2$ of a further tire of the vehicle, and a distance s between the tire and the further tire according to the following equation (8), as described in German Published Patent Application No. 10 2006 020 490.

$$r_{dyn} = \frac{1}{2\pi} \times \frac{\Psi \times s}{DG_2 \times X_1 - DG_1} \quad (8)$$

Here, $X_1$ indicates a circumference ratio, which may be calculated with the aid of the following equation (9), when the vehicle is driving straight-ahead, from a time integral of the first rate of rotation and a time integral of the second rate of rotation.

$$X_1 = \frac{\int DG_1}{\int DG_2} \quad (9)$$

The measured or calculated wheel load acts on the respective tire mainly on account of the load of the vehicle. The pressure deviation between the actual tire pressure and the setpoint tire pressure may be determined for the current wheel load for each tire of the vehicle. For example, these two values (i.e., the setpoint tire pressure and the actual tire pressure) may be communicated to the driver of the vehicle via a suitable interface. As a motivation for the driver to adapt the actual tire pressure to the setpoint tire pressure, the additional energy consumption caused by the incorrectly set tire pressure may also be displayed. (e.g., "2% (0.4l/100 km) higher energy consumption as a result of insufficient tire pressure"). Moreover, when a certain energy consumption threshold value is exceeded, a warning may be generated for the driver in order to alert the driver to the incorrectly set tire pressure. Furthermore, the driver may be warned of a safety risk due to the incorrect tire pressure. It is also possible to modify the tire pressure of the respective tire automatically such that it corresponds to the setpoint tire pressure.

To prevent an adaptation of the tire pressure to the setpoint tire pressure in response to every change in the wheel load, it is possible to determine an average, maximum or typical wheel load for the respective tire. In this case, the pressure deviation or the setpoint tire pressure may be determined as a function of this wheel load (and not of the respectively actual wheel load).

A system for determining a pressure deviation between a setpoint tire pressure and an actual tire pressure for a tire of a vehicle is also described herein. The system, which includes a control, is adapted to ascertain the dynamic tire radius and the wheel load for the tire. As a function of the dynamic tire radius and the wheel load, the system determines the pressure deviation with the aid of the control.

The advantages of the system substantially correspond to the advantages of the method explained in more detail above, so that they will not be repeated here.

The system is adapted in particular for carrying out each variant or example embodiment of the method.

Moreover, a further system for determining a wheel load for a tire of a vehicle is also provided. The further system, which includes a control, is adapted to ascertain the actual tire pressure via a tire pressure sensor of the further system and to determine the dynamic tire radius. If the non-loaded tire radius is known, the further system determines the wheel load as a function of the actual tire pressure, the dynamic tire radius and the non-loaded tire radius with the aid of the tire rigidity function.

Furthermore, a vehicle is provided, which includes a system and/or a further system as described herein.

Example embodiments of the present invention are explained in the following once more from another perspective on the basis of six variants.

Variant 1

In the first variant, the wheel load and the actual tire pressure are measured. On the basis of a specified function, the setpoint tire pressure is determined as a function of the wheel load. This function may be stored for all tire variants for example in a database to which the vehicle has access. As a subvariant, this function may also be constructed such that it applies to all authorized types of tires.

Variant 2

In this variant, the actual tire pressure is measured for example by a tire pressure sensor integrated in the tire and the dynamic tire radius is determined. On the basis of the specified function (see variant 1), the setpoint tire pressure is determined as a function of the wheel load. In contrast to variant 1, the wheel load in variant 2 is not measured, however, but is rather calculated. There exists a first relationship between the wheel load and the tire rigidity, as described above in equation (7), as a function of the non-loaded tire radius, which is presupposed as known in this variant, and the dynamic tire radius. Furthermore, there exists a second relationship between the wheel load and the tire rigidity via a specified tire rigidity function. Via these two relationships, it is possible to determine both the wheel load as well as the wheel rigidity.

Variant 3

In the third variant, the wheel load is measured and the dynamic tire radius is determined. On the basis of a specified function (see variant 1), the setpoint tire pressure is in turn determined as a function of the wheel load. In comparison to variant 2, although in this variant the wheel load is measured, the actual tire pressure is not known. Via equation (7), it is possible to calculate the tire rigidity as a function of the wheel load, the non-loaded tire radius, which is presupposed as known in this variant, and the dynamic tire radius. By solving the tire rigidity function for the actual tire pressure, it is possible to determine the actual tire pressure via the tire rigidity function as a function of the wheel load and the tire rigidity as well as, if applicable, the velocity of the vehicle.

Variant 4

As in variant 3, the wheel load is measured in this variant and the dynamic tire radius is determined. On the basis of a specified function (see variant 1), the setpoint tire pressure is in turn determined as a function of the wheel load. In this variant, a tire rigidity function is specified, in which the constants are not yet known. These constants are therefore determined for example with the aid of a Kalman filter (or another suitable filter) via the relationship between measured values for the wheel load and the velocity of the vehicle together with the actual tire pressure. The actual tire pressure is thus not measured in this variant, but is rather interpreted quasi as a constant of the tire rigidity function. The velocity of the vehicle should be taken into account when determining the constants. Once the constants have been determined, the velocity may be disregarded in a later application of the tire rigidity function since the actual tire pressure to be calculated must be valid for all velocities.

It should be pointed out that in this variant the determination of the pressure deviation between the setpoint tire pressure and the actual tire pressure can occur only after a certain time span, in which the constants of the tire rigidity function must be learned.

Variant 5

In this variant, the wheel load and the actual tire pressure are measured and the dynamic tire radius is determined. As in variant 4, the tire rigidity function is quasi first learned. Subsequently, this tire rigidity function may be used to determine the tire rigidity as a function of the wheel load, the actual tire pressure and the velocity of the vehicle. Via the previously described equation (4), the non-loaded tire radius may be calculated as a function of the wheel load, the dynamic tire radius and the tire rigidity. In contrast to the previously described variants, in this variant no function is specified for determining the setpoint tire pressure as a function of the wheel load. Instead, the setpoint tire pressure is determined via an optimization criterion or a design criterion in that for example an ideal dynamic tire radius is determined as a function of a specifiable fixed ratio between the ideal dynamic tire radius and the non-loaded tire radius. Using equation (6), it is then possible to calculate an ideal difference as a function of the non-loaded tire radius and the ideal dynamic tire radius. With this ideal difference, it is then possible to use equation (2) to calculate quasi an ideal tire rigidity or setpoint tire rigidity. By rearranging the tire rigidity function accordingly, it is possible to calculate the setpoint tire pressure as a function of the setpoint tire rigidity and the wheel load.

Variant 6

This variant largely corresponds to variant 5, although, in contrast to variant 5, the actual tire pressure is not determined such that only the wheel load is measured and the dynamic tire radius is determined. When the tire rigidity function is learned, the actual tire pressure is also determined in addition to learning or determining the constants such that then it is possible to proceed quasi in accordance with variant 5 in order to determine the setpoint tire pressure. Compared to variant 5, a poorer functional quality is to be expected in this variant 6. On the one hand, the phase, in which the constants and the actual tire pressure are learned, will require a greater time span in comparison to variant 5. On the other hand, the ascertained actual tire pressure will be ascertained with lower accuracy as compared to variant 5 such that also the determined pressure deviation will have a lower precision as compared to variant 5.

The possibly specified function for determining the setpoint tire pressure as a function of the wheel load may be provided specifically for each tire of the vehicle. It is also possible, however, that this function applies to all tires of the vehicle. In the extreme case, it is possible that the specified function applies to all authorized tires. Similarly, the possibly completely specified tire rigidity function may be provided specifically for each tire of the vehicle, for all tires of the vehicle or for all authorized tires of the vehicle.

The methods and systems described herein are suitable for motor vehicles, in particular trucks, but are not restricted to this preferred field of application, since it is also usable in airplanes as well as in track-guided vehicles.

Further features and aspects of example embodiments of the present invention are described in more detail below with reference to the figures.

DETAILED DESCRIPTION

Figure 1:
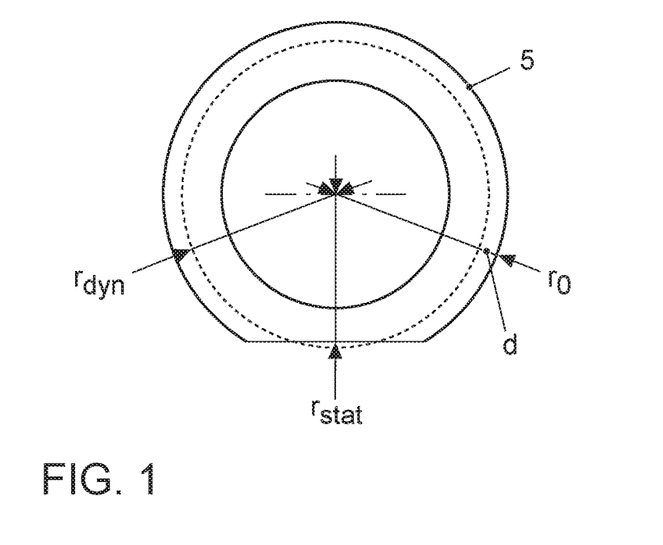
FIG. 1 is used to explain the terms static, dynamic and unloaded tire radius.

FIG. 1 shows a tire 5, which has a static tire radius $r_{stat}$, a dynamic tire radius $r_{dyn}$ and a non-loaded tire radius $r_0$. Static tire radius $r_{stat}$ defines the shortest distance between center axis 6 of tire 5 and the road on which the vehicle is standing. Dynamic tire radius $r_{dyn}$ may be calculated on the basis of the rolling circumference of the tire. The non-loaded tire radius $r_0$ is the largest radius measurable on tire 5 and corresponds to the tire radius that tire 5 assumes in the non-loaded state (i.e., no wheel load is acting on the tires). In summary, the following in equation (10) applies:

$$r_{stat} < r_{dyn} < r_0 \qquad (10)$$

Reference symbol d denotes the difference or the separation between non-loaded tire radius $r_0$ and dynamic tire radius $r_{dyn}$.

Figure 2:
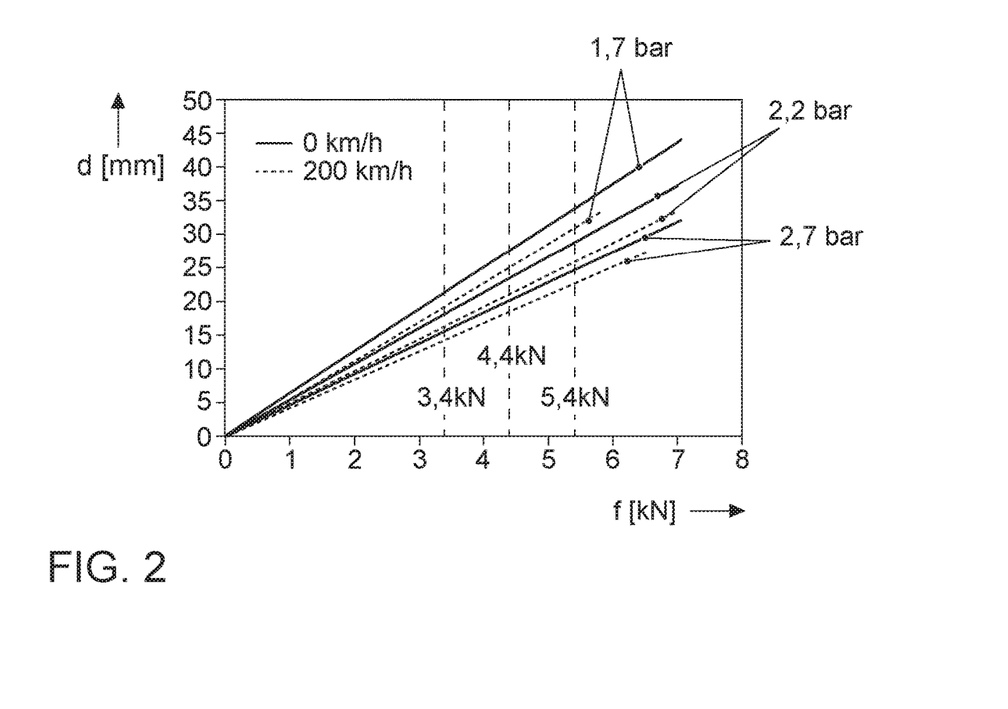
FIG. 2 shows examples of the tire rigidity (ratio between the difference between dynamic and unloaded tire radius and the wheel load).

FIG. 2 shows the approximately linear relationship or ratio m between difference d and wheel load f acting on the respective wheel 5 for a specific tire or tire type. Ratio m or the relationship between d and f depends on the actual tire pressure and on the velocity at which the vehicle is traveling. FIG. 2 shows ratio m for pressures 1.7 bar, 2.2 bar and 2.7 bar and respectively for a velocity of 0 km/h (i.e., for standstill), and for a velocity of 200 km/h.

Figure 3:
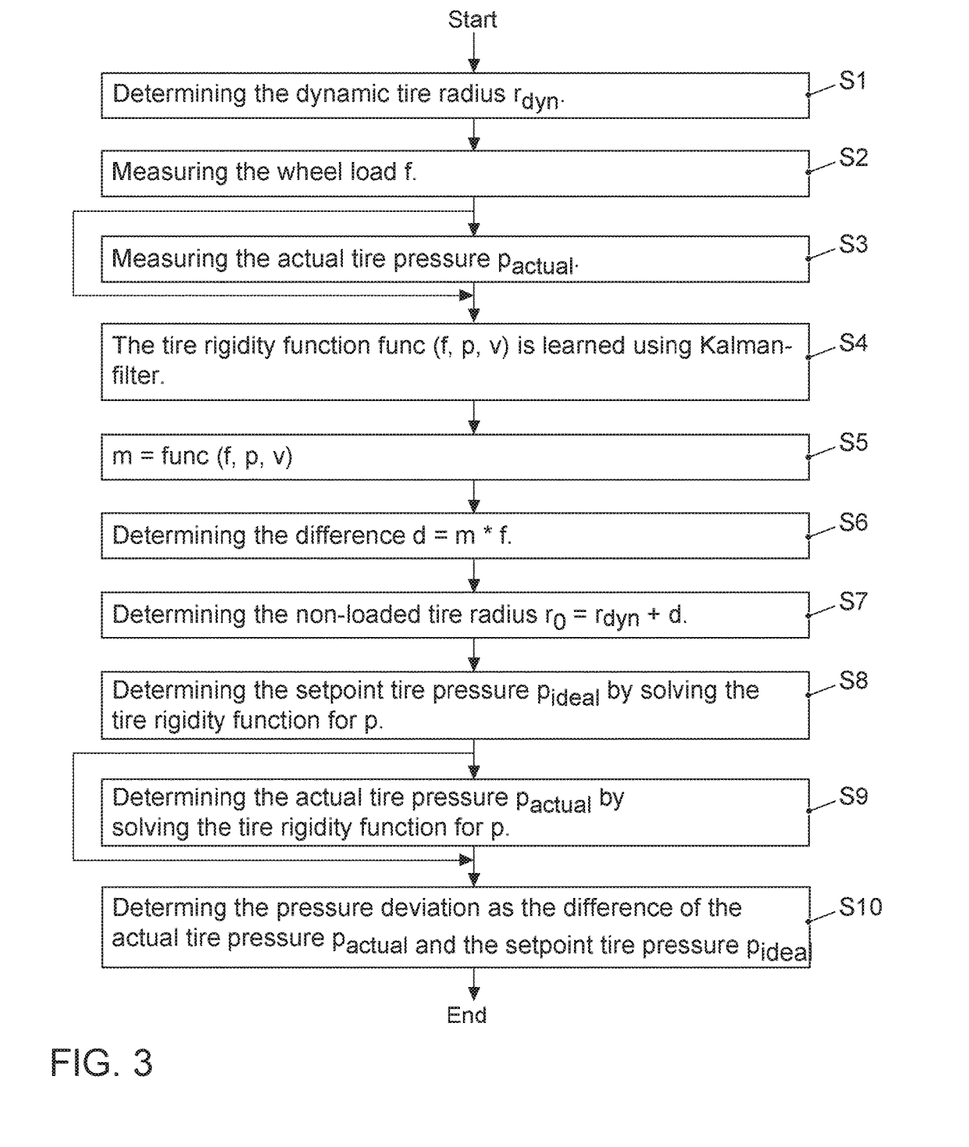
FIG. 3 shows the flow chart of an example embodiment of the present invention for determining the pressure deviation between the setpoint tire pressure and the actual tire pressure.

FIG. 3 shows a flow chart of a method according to an example embodiment of the present invention for determining the pressure deviation.

In first step S1, dynamic tire radius $r_{dyn}$ is determined. In general, it holds true that the lower the tire pressure and the higher the wheel load, the more the respective tire will be deformed in the area in which the tire contacts the road surface (i.e., the greater is the difference between dynamic tire radius $r_{dyn}$ and non-loaded tire radius $r_0$, and thus difference d).

In second step S2, wheel load f acting on the respective tire is determined. Wheel load f may be detected by suitable sensors, which in case of an air suspension, for instance, measure the air pressure within the corresponding suspension element. In a conventional suspension system of the vehicle, wheel load f may be detected based on the deflection of the corresponding suspension element.

If no suitable sensors exist, wheel load f acting on the respective tire may be entered manually by the driver of the vehicle, for example. Simplifications are possible in that for example only one load per axle of the vehicle is specified and a symmetrical load distribution is presupposed, so that half of the specified axle load is acting on the respective tire.

In third step S3, the actual tire pressure of the respective tire is detected by pressure sensors installed in the tire, for example. This step S3 is optional and supports in particular the automatic calibration of the tire constants or tire parameters in subsequent step S4. Moreover, a directly measured value for the actual tire pressure is to be preferred over the value calculated in step S9.

In fourth step S4, a tire rigidity function is determined, by which the tire rigidity, i.e. the ratio between m between the difference between dynamic tire radius $r_{dyn}$ and non-loaded tire ratio $r_0$ and the wheel load f acting on the respective tire is able to be determined as a function of the wheel load and the tire pressure.

For this purpose, measured values are detected or ascertained for each tire of the vehicle over a certain time span for the wheel load, the velocity and the dynamic tire radius. If the actual tire pressure is also available, corresponding measured values are additionally detected.

For example, using a Kalman filter (or a similar approach), it is possible to determine the parameters of the tire rigidity function m=func(f, p, v) in advance using the previously detected measured values (see FIG. 2). The constants or parameters estimated with the aid of the Kalman filter describe specific characteristics of the respective tire or tire type and define the tire rigidity function, so that it is possible to determine the tire rigidity m for the variables of tire pressure p, wheel load f and velocity v.

Alternatively, the function may also be provided in the form of a database in which the previously described tire rigidity function, by which it is possible to calculate the tire rigidity as a function of the tire pressure, the wheel load and the vehicle velocity are stored for the various types of tires. Furthermore, there is the option of storing the data, by which the tire rigidity function is described, on an RFID tag in or on the tire, for example, and of reading out these data in a contactless manner.

In step S5, the tire rigidity is calculated using the previously completely determined or learned tire rigidity function.

In subsequent step S6, difference d results from the product of tire rigidity m and wheel load f. Using difference d, it is possible to calculate in subsequent step S7 the non-loaded tire radius $r_0$ by an addition of dynamic tire radius $r_{dyn}$ and difference d.

Using an optimization criterion, the tire pressure or setpoint tire pressure that is optimized for the actually applied wheel load is calculated in subsequent step S8. This criterion is either present explicitly in the tire database as a map (function or characteristic curve), or it is used in a generally useable approximation (for example a predefined ratio $r_{ideal}/r_0$). By solving the previously determined tire rigidity function for p, it is possible to determine the setpoint tire pressure as a function of the wheel load using the rearranged tire rigidity function.

If the actual tire pressure $p_{actual}$ is not measured in step S3, it is possible to calculate it in step S9. For this purpose, the tire rigidity is calculated as a function of the dynamic tire radius $r_{dyn}$ and the wheel load f. The tire rigidity function is then solved for p such that using the rearranged function it is possible to calculate the actual tire pressure as a function of the wheel load, the velocity and the tire rigidity.

In step S10, the pressure deviation is calculated as the difference between the setpoint pressure $p_{ideal}$ and the actual tire pressure $p_{actual}$. This pressure deviation is monitored and the driver is informed or warned if necessary, or the actual pressure is adapted accordingly by an automatic pressure adaptation device.

Steps S5 through S10 may be repeated periodically.

Figure 4:
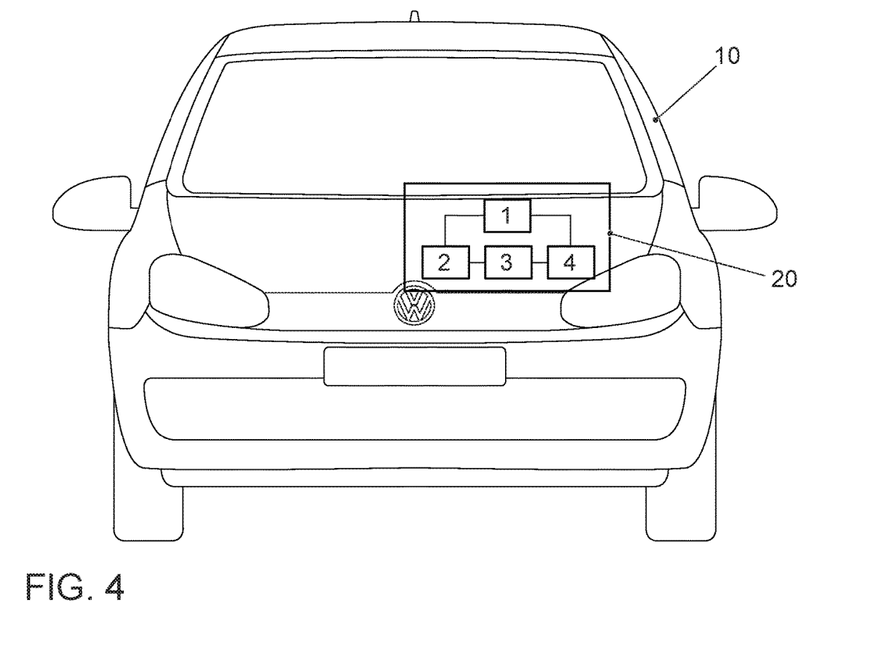
FIG. 4 schematically shows a vehicle having a system according to an example embodiment of the present invention.

FIG. 4 schematically shows a vehicle having a system 20 according to an example embodiment of the present invention. System 20 includes a control 1, a tire pressure sensor 2, a force sensor 3, and a velocity sensor 4.

LIST OF REFERENCE CHARACTERS 1 control
2 tire pressure sensor
3 force sensor
4 velocity sensor
5 tire
6 tire center axis
10 vehicle
20 system
d difference ($r_0-r_{dyn}$)
f wheel load
m tire rigidity
$p_{actual}$ actual tire pressure
$p_{ideal}$ setpoint tire pressure
$r_0$ tire radius in the non-loaded state
$r_{dyn}$ dynamic tire radius
$r_{stat}$ static tire radius
$S_1$-$S_{10}$ method step

The invention claimed is:

1. A method for indicating a vehicle tire pressure, the vehicle including a control device, a force sensor, wheel sensor, and a display, the method comprising:
    ascertaining, by the force sensor, a wheel load for the tire;
    ascertaining, by the wheel sensor, a dynamic tire radius of the tire; and
    determining, by the control device, a pressure deviation as a function of the wheel load and the dynamic tire radius;
    wherein a non-loaded tire radius of the tire is specified in a non-loaded state, and the actual tire pressure is calculated, by the control device, as a function of the wheel load, the non-loaded tire radius, and the dynamic tire radius using a tire rigidity function;
    wherein the tire rigidity function is specified, and the control device is configured to calculate a tire rigidity of the tire as a function of the wheel load, the actual tire pressure, and a velocity, at which the vehicle is currently traveling; and
    wherein constants of the tire rigidity function are learned in that measured values for the velocity and the wheel load are ascertained for multiple points in time and in that for these measured values the constants are determined such that an estimation error is minimized; and
    displaying, on the display, a setpoint tire pressure and the actual tire pressure.

2. The method according to claim 1, wherein the setpoint tire pressure is determined as a function of the wheel load using a setpoint tire pressure function.

3. The method according to claim 1, wherein the actual tire pressure is regarded as a constant and is also learned when the constants are learned.

4. The method according to claim 1, wherein:
    the tire rigidity (m) is determined using the tire rigidity function; and
    the non-loaded tire radius ($r_0$) is ascertained by the following equation as a function of the dynamic tire radius ($r_{dyn}$), the wheel load (f), and the tired rigidity (m):

$$r_0 = r_{dyn} + m*f.$$

5. The method according to claim 1, wherein:
    an ideal dynamic tire radius is specified; and
    the setpoint tire pressure is determined as a function of the ideal dynamic tire radius using the tire rigidity function.

6. A system for indicating a vehicle tire pressure, comprising:
- a control device adapted to ascertain, by a wheel sensor, a dynamic tire radius of the tire, to ascertain, by a force sensor, a wheel load for the tire, and to determine the pressure deviation as a function of the wheel load and the dynamic tire radius; and
- a display;
- wherein a non-loaded tire radius of the tire is specified in a non-loaded state, and the control device is configured to calculate the actual tire pressure as a function of the wheel load, the non-loaded tire radius, and the dynamic tire radius using a tire rigidity function;
- wherein the tire rigidity function is specified, and the control device is configured to calculate a tire rigidity of the tire as a function of the wheel load, the actual tire pressure, and a velocity, at which the vehicle is currently traveling; and
- wherein the control device is configured to learn constants of the tire rigidity function in that measured values for the velocity and the wheel load are ascertained for multiple points in time and in that for these measured values the constants are determined such that an estimation error is minimized; and
- wherein the control device is adapted to display, on the display, a set point tire pressure and the actual tire pressure.

7. A method for indicating a vehicle tire pressure, the vehicle including a control device, a pressure sensor, a wheel sensor, and a display, the method comprising:
- ascertaining, by the pressure sensor, an actual tire pressure;
- ascertaining, by the wheel sensor, a dynamic tire radius of the tire;
- specifying a non-loaded tire radius of the tire in a non-loaded state; and
- determining, by the control device, the wheel load for the tire as a function of the actual tire pressure, the dynamic tire radius, and the non-loaded tire radius using a tire rigidity function;
- wherein the tire rigidity function is specified, and the control device is configured to calculate a tire rigidity of the tire as a function of the wheel load, the actual tire pressure, and a velocity, at which the vehicle is currently traveling; and
- wherein constants of the tire rigidity function are learned in that measured values for the velocity and the wheel load are ascertained for multiple points in time and in that for these measured values the constants are determined such that an estimation error is minimized; and
- determining, by the control device, a tire rigidity (m) by the following equation as a function of the dynamic tire radius ($r_{dyn}$), the non-loaded tire radius ($r_0$), and the determined wheel load (f):

$$m = \frac{r_0 - r_{dyn}}{f}$$

- determining, the pressure deviation as a function of the determined wheel load and the dynamic tire radius; and
- displaying, on the display, a setpoint tire pressure and the actual tire pressure.

8. A vehicle, comprising the system recited in claim 6.

9. The method according to claim 1, further comprising:
- displaying a warning signal on the display if the set point tire pressure exceeds a threshold value.

* * * * *